April 28, 1953 A. D. SINGH 2,636,688
METHOD FOR TREATING COAL AND THE LIKE
Filed Feb. 20, 1948
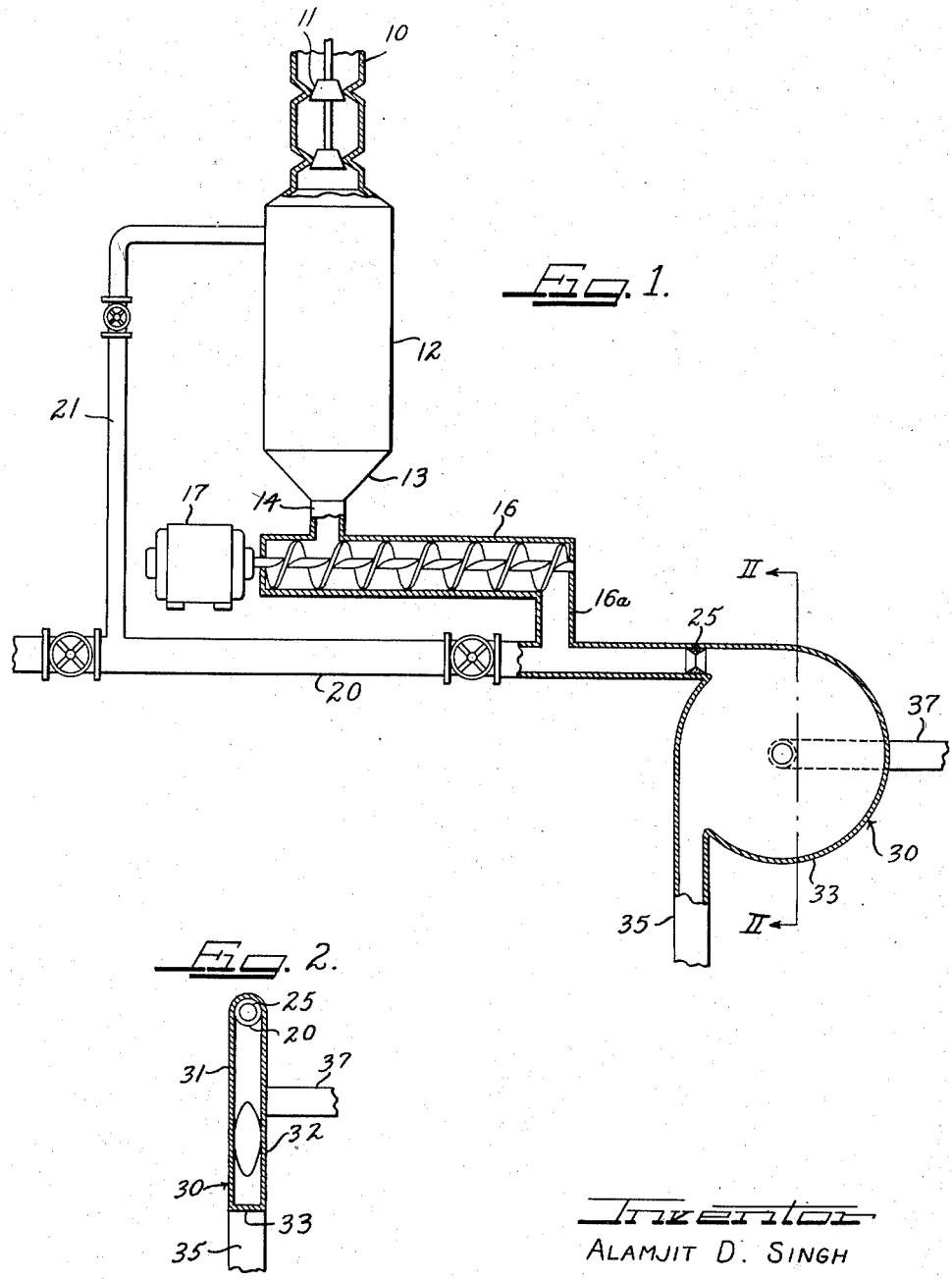
Inventor
ALAMJIT D. SINGH Patented Apr. 28, 1953

2,636,688

UNITED STATES PATENT OFFICE 2,636,688

METHOD FOR TREATING COAL AND THE LIKE

Alamjit D. Singh, Chicago, Ill., assignor to Institute of Gas Technology, Chicago, Ill., a corporation of Illinois Application February 20, 1948, Serial No. 9,717

3 Claims. (Cl. 241—1)

This invention relates to a method for preparing, from coarsely fragmented coal, a hot suspension in air of finely comminuted coal. The invention also pertains to apparatus adapted for carrying out this and other methods of treating coal.

Reference is made to the copending application of John I. Yellott Serial No. 762,589, now Patent No. 2,515,541, entitled "Comminution Device" filed July 22, 1947. This copending application discloses a combination, with a flash pulverizing device for solid material capable of yielding an entrainment of comminuted solids in a streaming gas, of a vortex chamber arranged so as to receive said streaming entrainment in a generally tangential direction and at one side of the axis of said chamber, the latter being provided with a central axial discharge aperture. In this apparatus, coal may be comminuted by a method described as follows: The flash pulverizing device includes a source of expansible fluid held under a pressure such that the fluid can be expanded with a pressure drop of at least 15 lb. per sq. in. The compressed fluid is continuously discharged from this source into an elongated conduit, to form a stream of compressed fluid flowing at a velocity less than one-half of the critical velocity but, in any event, at least sufficient to suspend therein a granular solid permeable to the compressed fluid. There is thus established a stream of compressed fluid flowing in an elongated conduit and capable of being expanded with a pressure drop of at least 15 lb. per sq. in. This stream of fluid is passed into a restricted area, such as a convergent nozzle or a restricted orifice, so as practically instantaneously to accelerate said fluid to critical velocity and simultaneously to reduce the fluid pressure by at least 15 lb. per sq. in. The fluid is discharged from the restricted area (the convergent nozzle or restricted orifice) as by allowing the fluid to escape into a divergent nozzle, into a conduit of at least the same diameter as the conduit upstream of the restricted area, or directly into the vortex chamber. Concurrently and continuously, solid granules are introduced into the flowing stream of compressed fluid sufficiently far upstream of the constricted area to suspend the solid granules in the flowing stream of compressed fluid and to permit acceleration of said granules by said streaming fluid in said restricted area. The amount of solid material introduced into the streaming fluid is limited so as to permit a pressure drop, at the restricted area, of at least 15 lb. per sq. in. In general, less than 6 parts (by weight) of solids should be used to each part of fluid. Then, on passing through and past the restricted area, the solid granules are shattered, probably due to the sudden expansion of the compressed fluid contained within the granules which are permeable to the compressed fluid and are believed to have become permeated thereby while being contacted by the compressed fluid upstream of the restricted area.

Thus, the flash pulverizing device yields a gaseous entrainment of comminuted solid particles moving rapidly but under lower pressure than the original gaseous entrainment of relatively coarse particles to be comminuted. The kinetic energy content of the gaseous entrainment of comminuted or shattered particles is utilized for further comminution in the vortex chamber. The gaseous entrainment of comminuted or shattered particles is discharged, from the flash pulverizing device, through a divergent nozzle, or through a short conduit (mentioned hereinabove), or, preferably, directly, into the vortex chamber. This discharge is directed generally tangentially into the vortex chamber, so that the rapidly flowing gaseous entrainment initially impinges against the chamber wall and then establishes a vortical or whirling flow in said chamber, which is provided with an axial central discharge opening. Due to the vortical or whirling movement of the fluid, the relatively less fine shattered particles move radially outwardly within the vortex chamber, while the relatively fine particles tend to remain in the central region of the vortex chamber and are discharged through the central axial aperture. The relatively less fine particles thrown radially outwardly within the chamber by centrifugal force are carried around in the outer portion of the chamber and are there further comminuted by impact against the peripheral wall of the chamber and with other particles and by abrasion between said outer wall and other particles. When thus comminuted, disintegrated or worn down to smaller particle size, the resulting smaller particles are discharged through an axial central discharge aperture.

Thus, in the vortex chamber, the kinetic energy of the mixture of a fluid and solids issuing from the constricted area in the flash pulverizing conduit is utilized for further comminution in the vortex chamber directly receiving said mixture, as by impact against the walls of the vortex chamber and by abrasion against the walls of the vortex chamber. Further, the vortex chamber tends to separate the variously sized solid particles and to pulverize additionally the coarser of those particles by impact and/or attrition.

The method of the present invention relates particularly to the combination, with the flash pulverization step, of immediately succeeding impact and/or attrition steps utilizing the kinetic energy of the flash pulverized gas-solid mixture, as applied to the pulverization of coal with air or other oxygen containing gases. For this purpose, I have provided additional steps and features not shown in said copending Yellott application whereby the comminution of coal with air is rendered more efficient, as disclosed in further detail hereinbelow.

I have found that in the vortex chamber, coal is shattered more efficiently if maintained above its softening or fusion temperature. However, if air is utilized in the flash pulverizing device for effecting comminution of the coal in the nozzle or constricted area of the flash pulverizing device, then the coal must be maintained below its softening temperature or fusion point while passing the constricted orifice or other restricted area in the flash pulverizing device, since otherwise the nozzle, restricted orifice or other restricted area in the flash pulverizing device will become clogged by softened, partially coked or even partially burned coal. I, therefore, introduce tangentially into the vortex chamber, air at an elevated temperature and moving relatively rapidly, by means of a conduit discharging tangentially into the vortex chamber and connected to a suitable source of compressed hot air. The hot air thus tangentially introduced into the vortex chamber not only raises the temperature of the flash pulverized coal at least to its softening point, but also reinforces and accelerates the vortical movement within the vortex chamber, to effect improved comminution within the vortex chamber as well as improved classification as between relatively coarse and relatively fine particles.

It should be understood that the effect of the additional hot air introduced into the vortex chamber is two-fold. First, due to the rapid flow of the tangentially introduced air, improved separation of relatively coarse and relatively fine particles will be effected within the vortex chamber, the residence time for the relatively coarse particles may be prolonged, and, due to the greater gas-solid ratio prevailing in the vortex chamber, a relatively larger amount of kinetic energy is available for comminution of the solids, so that the relatively coarse particles are further comminuted.

Secondly, the mere raising of the temperature of the coal particles within the vortex chamber renders the coal more friable, with resultant improved comminution. In this connection, it should be noted that even relatively slight devolatilization (vaporization and separation from the coal of volatile constituents thereof) may cause the conversion of the coal particles into gaseous irregular globules with very thin walls which pulverize readily. Since the temperature of the coal particles is raised very rapidly or practically instantaneously, the gas generated within the coal particles may even cause explosive shattering thereof.

The temperature within the vortex chamber may be maintained by simply preheating the secondary air or other oxygen containing air introduced into the vortex chamber to a sufficiently high temperature, without effecting combustion within the vortex chamber. In this case, the heat content of the secondary air is utilized to maintain the desired temperature in the vortex chamber. It is also possible to bring about combustion in the vortex chamber, by suitable regulation of the amount and temperature of secondary air or other oxygen containing gas entering the vortex chamber. In this case, the combustion may involve the gaseous products evolved from the coal particles in the vortex chamber, so also the coal particles themselves, before or after a more or less complete devolatilization. Where relatively high temperatures are desired, I prefer to bring about partial combustion within the vortex chamber. Particularly good comminution is effected at 1100° F. or higher temperatures.

The product of the instant process is a hot suspension in air of finely comminuted more or less incompletely devolatilized coal. The heat content of the suspension may be utilized by subjecting the hot suspension to combustion, to gas forming reactions, or to other chemical processes wherein the heat content of the suspension is utilized. In other words, the product of the instant process may be considered as being a preheated mixture of air and finely comminuted, more or less devolatilized coal suitable for use in other and further processes.

The apparatus of the present invention differs principally from that disclosed and claimed in said copending Yellott application by the provision of a tangential gas inlet into the vortex chamber adapted to be connected to a source of compressed hot air or the like. Obviously, this apparatus may also be employed for the introduction of other gases into the vortex chamber.

It is therefore an important object of the present invention to provide an improved method for the comminution of coal by means of air or other oxygen containing gas at a temperature above the softening point of the coal yielding a hot suspension in air of more or less devolatilized, finely comminuted coal.

Another important object of the present invention is to provide an improved method for comminuting coal involving an initial flash pulverization of the coal with air or other oxygen containing gas carried out below the softening or fusion point of the coal followed by an impact and/or attrition step utilizing the kinetic energy of the flash pulverized air-coal mixture at a temperature above the softening point of the coal reached by addition, to the flash pulverized coal-air mixture, of additional air at an elevated temperature.

A further important object of the present invention is to provide an improved comminution device suitable for use in the grinding of coal and comprising a flash pulverizing device discharging directly and tangentially into a vortex chamber also receiving tangentially additional amounts of a gas such as hot air.

Other and further objects and features of the present invention will become apparent from the following description and appended claims taken in conjunction with the accompanying drawings which show, diagrammatically and by way of example, apparatus according to the present invention for carrying out the novel and improved process described above. More particularly:

Figure 1 is a vertical cross-sectional view, with parts shown in elevation, of an apparatus according to the present invention; and Figure 2 is a transverse cross-sectional view taken along the line II—II of Figure 1.

As shown on the drawings:

In Figure 1, the numeral 10 indicates a hopper having a conical bottom for receiving coarsely fragmented coal. The hopper 10 is provided at its discharge end with double bell and hopper device 11 or other gas lock means for discharge into a tank 12 having a conical bottom 13 discharging into a conduit 14. The latter communicates directly with and serves to conduct the coal to be comminuted into a horizontally extending tubularly enclosed screw feeder or conveyor 16 driven by a motor 17. The screw conveyor 16 moves the coal, by way of a vertical extension 16a, into horizontally extending conduit 20. Air under pressure is admitted into the left-hand end of the conduit 20 and into the upper portion of the tank 12 through a valved conduit 21 tapping the conduit 20. The right-hand end portion of the conduit 20, downstream of the discharge opening of the screw conveyor 16, is constricted, as at 25, to form a convergent-divergent nozzle communicating directly and tangentially with a circular vortex chamber indicated generally by the reference numeral 30 and extending in a generally horizontal axial direction. More particularly, the vortex chamber 30 includes spaced, disk-shaped left and right side walls 31 and 32 together with an intermediate annular wall 33. It will be noted that the end of the nozzle 25 is attached to the annular wall 33 preferably approximately midway between the side walls 31 and 32 so as to discharge into the chamber 30 transversely and to one side of the axis of the chamber 30.

A conduit 35 is adapted to discharge hot air or the like tangentially into the chamber 30. The conduit 35 may have its discharge orifice spaced from the discharge orifice 25 by 90°, 180°, 270° or as otherwise desired.

The right-hand side wall 32 of the chamber 30 is pierced by a central axial aperture 36 discharging into conduit 37 which may discharge into a cyclone type or other separating device (for segregating the comminuted coal from the air) into a combustion furnace or into some other device for collecting, utilizing or further processing the product issuing through the conduit 37.

At the start of the operation of the above described apparatus, coal in coarsely fragmented form is charged through the hopper 10 and the gas lock 11 into the tank 12. Air under pressure is introduced through the conduits 20 and 21 into the tank 12 and caused to flow through the conduit 20. The screw conveyor 16 is operated to advance the coal to be comminuted into the stream of air advancing through the conduit 20. The nozzle 25 is so spaced from the discharge opening of the screw conveyor 16 that the coal discharged into the conduit will be accelerated by the gas flowing through the conduit 20 before reaching the nozzle 25. Instantaneous expansion occurs continuously as the compressed air in the conduit 20 passes through the nozzle 25 and causes the shattering of the solid particles, apparently by virtue of the expansion of compressed air contained within the porosities of the coal.

The operating pressure for the air in the conduit 20 should be at least 5 lbs. per sq. in., and may be as high as 750 lbs. per sq. in. If upstream pressures of 5 lbs. per sq. in. are used, however, the required downstream pressure will be below atmospheric and the degree of comminution is not so great. At the preferred operating gauge pressure of about 80 lbs. per sq. in. in the conduit 20, the pressure downstream of the nozzle 25 may suitably be about 5 lbs. per sq. in. or less.

It should be understood that the pressure drop across the nozzle 25 should be such as to accelerate the fluid flowing through the nozzle to the critical velocity. Ahead of the nozzle 25, the fluid may suitably flow at from 10 to 400 feet per second. The pressure upstream of the nozzle should be at least 15 lbs. per sq. in. above the pressure downstream of the nozzle. The extent of comminution in the nozzle is determined, inter alia, by the pressure level of operation, by the difference between the upstream and the downstream pressures on the two sides of the nozzle 25, by the ratio of fluid to solids passing through the nozzle 25, and by the rate of movement of solids through the nozzle 25. Finer comminution is effected in the nozzle by the maintenance of maximum upstream and minimum downstream pressures, by the use of relatively large amounts of fluid as compared to the amount of solids, and by the establishment of rapid flow of solids through the nozzle.

The streaming entrainment of comminuted coal issues from the nozzle 25 into the vortex chamber 30 where the fluid forms an inwardly spiraling vortex. The fluid being introduced moves at a high rotative speed but at a low inward speed in said vortex so that the relatively less fine particles, under the action of centrifugal force, are kept in the peripheral portions of the vortex chamber 30 where they are further comminuted or disintegrated by the initial impact upon the chamber wall, by further impact upon the chamber wall (subsequent to the initial impact following discharge from the nozzle 25), by impact upon other particles or by attrition. Because of the high rotative rate of movement of the fluid and its relatively low inward rate of movement, there is a strong tendency to return to the outer portion of the vortex for further grinding action such relatively less fine particles as may be thrown or bound into, or otherwise may reach the inner portion of the vortex chamber. The relatively fine particles introduced through the nozzle 25, as well as the particles of similar fineness resulting from further grinding of relatively less fine particles, are entrained by the gas being discharged through the axial aperture 36 and are carried through the conduit 37 for discharge from the apparatus.

The extent of comminution in the vortex chamber 30 is determined, inter alia, by the temperature of the gases discharged into the vortex chamber (as will be discussed in more detail hereinbelow), the rate of movement of the solid particles within the vortex chamber, the ratio of gas to solids, and the like. Finer comminution may be effected by rapid movement of solids and the use of large amounts of gas as compared with the amounts of solids introduced into the vortex chamber. Gas tangentially admitted into the vortex chamber 30 through the conduit 35 contributes to the vortical movement of solid particles through the vortex chamber 30.

The extent of devolatilization in the vortex chamber is discussed in greater detail hereinbelow. However, it may be stated, at this time, that, in general, the extent of devolatilization is determined, inter alia, by the particle size of the solid material, the temperature, the time of residence of the solid material in the vortex chamber, the amount of the fluid introduced into the vortex chamber, and the like. More extensive combustion or devolatilization are favored by small particle size, high temperature, long time of residence, and the use of large amounts of fluid containing relatively high concentrations of oxygen.

Air or other oxygen containing gas is admitted into the system at two localities. First, the air required for flash pulverization is admitted into the conduit 20 and there admixed with the coal. Additional amounts of air are admitted tangentially into the vortex chamber 30 through the conduit 35, under such pressure, at such velocity or with such momentum as may be required to overcome the internal pressure within the vortex chamber and, if desired, to increase the rate of flow within the vortex chamber. The preferred temperatures of these two sources of air are discussed in the following paragraphs.

The temperature of the air flowing through the conduit 20 should be such that no clogging of the nozzle 25 will take place, i. e., neither the fusion nor the combustion temperatures of the coal should be reached. This end will be attained if the temperature of the air admitted into the conduit 20 is kept below 600° F. and, preferably, not higher than 500° F. The exact maximum permissible temperature at the nozzle 25 and in the conduit 20 is determined by the fusion point of the coal, which varies according to the origin of the coal. By way of example, I tabulate hereinbelow the values obtained by the United States Bureau of Mines in the determination of the softening temperatures of nine samples of coal obtained from different localities:

| Coal No. | State | County | Coal Bed | Softening Temperatures | |
|---|---|---|---|---|---|
| | | | | °C. | °F. |
| 1 | Pennsylvania | Allegheny | Pittsburgh | 320 | 608 |
| 2 | Kentucky | Letcher | Elkhorn | 340 | 644 |
| 3 | Virginia | Wise | Taggart | 314 | 597 |
| 7 | Alabama | Jefferson | Mary Lee | 322 | 612 |
| 10 | Illinois | Franklin | No. 6 | 275 | 527 |
| 14 | West Virginia | Logan | Chilton | 304 | 579 |
| 19 | Utah | Carbon | L. Sunnyside | 295 | 563 |
| 20 | Pennsylvania | Allegheny | Thick Freeport | 293 | 559 |
| 23 | West Virginia | McDowell | Pocahontas 4 | 407 | 765 |

These figures have been taken from Table I, United States Bueraru of Mines, Monograph 5, 1934.

While the temperature in the conduit 20 and in the nozzle 25 should be maintained below the softening temperature of the coal being comminuted, the temperature in the vortex chamber 30 should be maintained above the softening temperature of the coal. The heat required for this purpose may be derived exclusively from the hot air introduced into the vortex chamber 30 through the conduit 35, or may be derived partially from the heat content of this air and partially from an incomplete combustion of the coal or products of devolatilization effected within the vortex chamber 30. Whether or not such incomplete combustion will occur depends, of course, upon whether or not the ignition temperature of the coal or products of devolatilization of the coal is reached within the vortex chamber 30. Partial combustion within the vortex chamber 30 brings about a relatively high temperature with resultant finer comminution, as compared to the case when the temperature is insufficient for combustion within the vortex chamber, although, in the latter case the comminution is finer than when the temperature in the vortex chamber 30 falls below the softening temperature of the coal.

Combustion within the vortex chamber 30 is initiated and maintained by the flow of hot air or other oxygen containing gas through the conduit 35 into the vortex chamber 30.

By way of illustrative examples, I tabulate hereinbelow the results obtained in a few experiments carried out with the apparatus described hereinabove as operated under the above disclosed conditions.

TABLE I

*Experimental data on the flash pulverization of Illinois coal*

| Exp. No. | Ratio Primary Air to Coal | Ratio Suppl. Air to Coal | Temp. Primary Air, °F. | Temp. Center Vortex Chamber, °F. | Temp. Suppl. Air, °F. |
|---|---|---|---|---|---|
| 1 | 1.36 | 2.7 | 500 | 580 | 1,300 |
| 2 | 0.84 | 2.0 | 450 | 730 | 1,650 |
| 3 | 0.87 | 1.2 | 330 | 480 | 1,185 |
| 4 | 1.23 | 1.2 | 450 | 1,400 | 1,575 |
| 5 | 1.10 | 2.3 | 320 | 1,700 | 1,380 |
| 6 | 1.14 | 2.0 | 360 | 1,330 | 1,160 |
| 7 | 1.29 | 2.3 | 310 | 1,380 | 1,370 |

TABLE II

*Analytical data on the flash pulverization of Illinois coal*

| Exp. No. | Volatile Matter, Percent | Screen Analysis—Percent Retained on U. S. Sieve | | | | | | |
|---|---|---|---|---|---|---|---|---|
| | | 20 | 40 | 60 | 100 | 200 | 325 | −325 |
| 1 {F | 31.0 | 4.8 | 11.0 | 13.6 | 19.2 | 22.0 | 8.0 | 21.0 |
| {P | 24.9 | 0.2 | 1.0 | 1.8 | 5.2 | 12.2 | 7.6 | 71.8 |
| 2 {F | 30.8 | 8.4 | 12.0 | 12.5 | 16.4 | 18.7 | 7.5 | 23.7 |
| {P | 29.8 | 0.7 | 1.0 | 3.0 | 7.6 | 15.1 | 8.7 | 63.0 |
| 3 {F | 31.0 | 12.3 | 13.3 | 11.7 | 15.2 | 17.7 | 7.3 | 22.0 |
| {P | 30.4 | 0.5 | 2.0 | 3.6 | 7.7 | 14.5 | 8.6 | 63.8 |
| 4 {F | 31.2 | 6.3 | 10.0 | 9.8 | 13.4 | 16.7 | 10.2 | 31.7 |
| {P | 15.2 | 0.0 | 1.2 | 0.8 | 1.6 | 5.8 | 8.1 | 82.5 |
| 5 {F | 35.5 | 0.0 | 34.6 | 22.0 | 17.6 | 12.5 | 3.6 | 10.5 |
| {P | 14.2 | 0.8 | 2.5 | 3.2 | 9.2 | 14.0 | 8.5 | 61.0 |
| 6 {F | 35.6 | 0.0 | 27.0 | 22.6 | 18.9 | 13.8 | 4.0 | 12.8 |
| {P | 32.0 | 0.0 | 0.3 | 1.4 | 5.8 | 23.5 | 15.5 | 53.1 |
| 7 {F | 33.2 | 0.1 | 25.3 | 20.7 | 18.4 | 13.5 | 5.1 | 15.2 |
| {P | 28.6 | 0.4 | 0.6 | 0.5 | 2.9 | 12.6 | 9.3 | 74.2 |

F Refers to Feed.
P Refers to Product.

The above tabulated data were obtained with an upstream air gauge pressure varying from 78 to 86 lb. per sq. in.; a downstream vacuum of about 1 in. of mercury; approximately atmospheric supplementary air pressure. In the last four tabulated experiments, combustion occurred within the vortex chamber.

Particular attention is directed to the fact that the finest comminuation occurred when combustion took place within the vortex chamber. Further, the greatest extent of devolatilization occurred when combustion took place within the vortex chamber, although the fact that such combustion takes place does not necessarily bring about a high degree of devolatilization.

It will thus be seen that I have provided a novel method for disintegrating coal by the use of compressed air at an elevated temperature including the steps of (1) forming a suspension of coarsely comminuted coal in air or other oxygen containing gas below the softening temperature of the coal but, preferably, within 100° to 200° F. within said softening temperature, said suspension flowing under a pressure such that the air can be expanded with a pressure drop of at least 15 lb. per sq. in.; (2) expanding the flowing suspension to effect a sudden pressure drop of at least 15 lb. per sq. in. by passing the suspension into a restricted area and immediately discharging said suspension from said restricted area so as to accelerate the suspension practically instantaneously to critical velocity whereby the pressure of the air is suddenly reduced and the coal granules are shattered; (3) confining the resulting suspension of shattered particles flowing at accelerated velocity within an annular surface while forming the suspension into a vortex and, by tangential flow, incorporating with said vortex hot air or other oxygen containing gas to bring the temperature within said vortex above the softening temperature or preferably, above the combustion temperature of the coal or the volatile constituents thereof which is thereby further comminuted; and (4) withdrawing from the center of said vortex hot gas having suspended therein relatively fine particles of more or less devolatilized coal. The resulting product is a suspension of finely comminuted, more or less devolatilized coal in hot air and/or combustion gases or mixtures thereof from which the coal particles may be recovered, or the suspension may be directly utilized for combustion, gas manufacture or the like.

I have further provided a novel device for comminuting coal by means of compressed air or the like comprising a flash pulverizing device (such as that disclosed in said copending Yellott application), discharging directly and tangentially into a vortex chamber provided with an axial outlet and a tangential inlet for hot air or like gases.

Many details of construction and operation may be varied within a wide range without departing from the principles of this invention and it is therefore not my intention to limit the patent granted on this invention otherwise than necessited by the scope of the appended claims.

I claim as my invention:

1. In the method of disintegrating granular coal which comprises providing a source of compressed gas capable of being expanded with a pressure drop of at least 15 pounds per square inch, continuously and uninterruptedly discharging gas from said source while confining the discharged gas to establish a stream of gas flowing uninterruptedly and continuously from said source to and past a discharge point spaced from said source, concurrently, continuously and uninterruptedly introducing said coal into said stream ahead of said discharge point for acceleration and suspension of the coal granules by said gas ahead of said discharge point, at said discharge point establishing and continuously and uninterruptedly maintaining a sharp gas pressure gradient, the pressure of said granule suspending gas being instantaneously reduced as said granule suspending gas continuously and uninterruptedly flows past said discharge point, said stream of gas having a substantially uniform cross sectional area upstream of said discharge point and being sharply constricted only at said discharge point whereby the total gas pressure drop in said stream is concentrated at said discharge point, the drop in gas pressure at said discharge point being continuously and uninterruptedly maintained at a value of at least 15 pounds per square inch and the gas pressure immediately downstream of said discharge point being reduced at least to an extent where further downstream pressure reduction will not bring about a substantially increased weight rate of flow past said discharge point, said coal being introduced into said stream in the form of granules smaller than the cross section of said stream at said discharge point and in an amount not greater than six parts by weight of coal for each part by weight of gas, each of said suspended coal granules being carried in suspension by said streaming gas along a substantially straight path to and past said discharge point and there further accelerated and subjected to said instantaneous drop in gas pressure whereby all said coal granules are disintegrated in the same manner and there is formed a rapidly flowing suspension of shattered coal particles in expanded gas, confining said rapidly flowing suspension within a cylindrical axially limited space while forming said suspension into a vortex, the rate of flow within said vortex being such that said shattered particles are kept circulating within said space and thereby further comminuted, and withdrawing from the center of said vortex gas having suspended therein relatively fine coal particles, the improvement comprising maintaining the temperature of said coal below the softening point upstream of said discharge point, incorporating additional gas containing free oxygen with said vortex at a pressure substantially the same as that prevailing inside said vortex and effecting combustion in said vortex to maintain the temperature thereof above the softening point of said coal.

2. In the method of disintegrating granular coal which comprises providing a source of compressed gas capable of being expanded with a pressure drop of at least 15 pounds per square inch, continuously and uninterruptedly discharging gas from said source while confining the discharged gas to establish a stream of gas flowing uninterruptedly and continuously from said source to and past a discharge point spaced from said source, concurrently, continuously and uninterruptedly introducing said coal into said stream ahead of said discharge point for acceleration and suspension of the coal granules by said gas ahead of said discharge point, at said discharge point establishing and continuously and uninterruptedly maintaining a sharp gas pressure gradient, the pressure of said granule suspending gas being instantaneously reduced as said granule suspending gas continuously and uninterruptedly flows past said discharge point, said stream of gas having a substantially uniform cross sectional area upstream of said discharge point and being sharply constricted only at said discharge point whereby the total gas pressure drop in said stream is concentrated at said discharge point, the drop in gas pressure at said discharge point being continuously and uninterruptedly maintained at a value of at least 15 pounds per square inch and the gas pressure immediately downstream of said discharge point being reduced at least to an extent where further downstream pressure reduction will not bring about a substantially increased weight rate of flow past said discharge point, said coal being introduced into said stream in the form of granules smaller than the cross section of said stream at said discharge point and in an amount not greater than six parts by weight of coal for each part by weight of gas, each of said suspended coal granules being carried in suspension by said streaming gas along a substantially straight path to and past said discharge point and there further accelerated and subjected to said instantaneous drop in gas pressure whereby all said coal granules are disintegrated in the same manner and there is formed a rapidly flowing suspension of shattered coal particles in expanded gas, confining said rapidly flowing suspension within a cylindrical axially limited space while forming said suspension into a vortex, the rate of flow within said vortex being such that said shattered particles are kept circulating within said space and thereby further comminuted, and withdrawing from the center of said vortex gas having suspended therein relatively fine coal particles, the improvement comprising maintaining the temperature of said coal upstream of said discharge point below the softening point but within 200° F. of said softening point, incorporating additional gas containing free oxygen with said vortex at substantially the same pressure as that prevailing inside said vortex, and effecting combustion in said vortex to maintain the temperature thereof at from 800° to 1800° F.

3. In the method of disintegrating granular coal which comprises providing a source of compressed gas capable of being expanded with a pressure drop of at least 15 pounds per square inch, continuously and uninterruptedly discharging gas from said source while confining the discharged gas to establish a stream of gas flowing uninterruptedly and continuously from said source to and past a discharge point spaced from said source, concurrently, continuously and uninterruptedly introducing said coal into said stream ahead of said discharge point for acceleration and suspension of the coal granules by said gas ahead of said discharge point, at said discharge point establishing and continuously and uninterruptedly maintaining a sharp gas pressure gradient, the pressure of said granule suspending gas being instantaneously reduced as said granule suspending gas continuously and uninterruptedly flows past said discharge point, said stream of gas having a substantially uniform cross sectional area upstream of said discharge point and being sharply constricted only at said discharge point whereby the total gas pressure drop in said stream is concentrated at said discharge point, the drop in gas pressure at said discharge point being continuously and uninterruptedly maintained at a value of at least 15 pounds per square inch and the gas pressure immediately downstream of said discharge point being reduced at least to an extent where further downstream pressure reduction will not bring about a substantially increased weight rate of flow past said discharge point, said coal being introduced into said stream in the form of granules smaller than the cross section of said stream at said discharge point and in an amount not greater than six parts by weight of coal for each part by weight of gas, each of said suspended coal granules being carried in suspension by said streaming gas along a substantially straight path to and past this discharge point and there further accelerated and subjected to said instantaneous drop in gas pressure whereby all said coal granules are disintegrated in the same manner and there is formed a rapidly flowing suspension of shattered coal particles in expanded gas, confining said rapidly flowing suspension within a cylindrical axially limited space while forming said suspension into a vortex, the rate of flow within said vortex being such that said shattered particles are kept circulating within said space and thereby further comminuted, and withdrawing from the center of said vortex gas having suspended therein relatively fine coal particles, the improvement comprising maintaining the temperature of said coal below the softening point upstream of said discharge point, incorporating additional gas containing free oxygen with said vortex at a pressure substantially the same as that prevailing inside said vortex and effecting combustion in said vortex to maintain the temperature thereof above the softening point of said coal, said combustion being initiated by heating said additional gas before said additional gas is incorporated with said vortex.

ALAMJIT D. SINGH.

References Cited in the file of this patent

UNITED STATES PATENTS

| Number | Name | Date |
|---|---|---|
| 369,836 | Blackman | Sept. 13, 1887 |
| 1,578,609 | Mason | Mar. 30, 1926 |
| 1,922,313 | Mason | Aug. 15, 1933 |
| 2,032,827 | Andrews | Mar. 3, 1936 |
| 2,184,300 | Hodson | Dec. 26, 1939 |
| 2,306,462 | Moorman | Dec. 29, 1942 |
| 2,385,508 | Hammond | Sept. 25, 1945 |
| 2,392,866 | Stephanoff | Jan. 15, 1946 |
| 2,515,541 | Yellott | July 18, 1950 |
| 2,515,542 | Yellott | July 18, 1950 |

OTHER REFERENCES

Report of Investigation R. I. 3306, pages 8, 9 and 10, 1936.

Article, D. Meigs in February 1941 issue, of Chemical and Metallurgical Engineering (pp. 122–125).

Industrial and Engineering Chemistry for July 1946, pages 672–678.